Jan. 18, 1938.  E. G. GARTIN  2,105,493
LUBRICATING APPARATUS
Filed Dec. 3, 1934
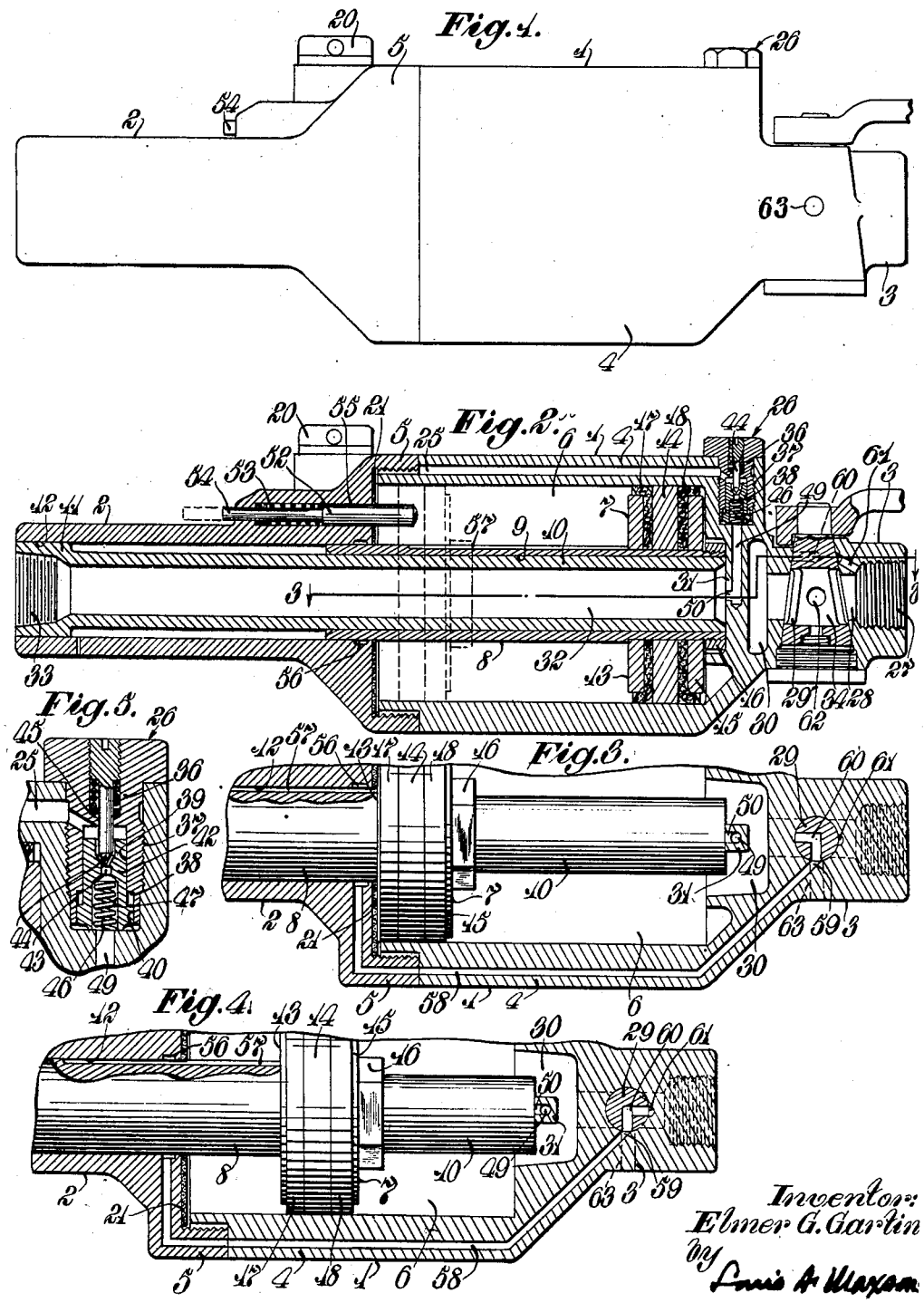
Inventor:
Elmer G. Gartin
by
Louis A. Waxam
Att'y.

Patented Jan. 18, 1938

2,105,493

UNITED STATES PATENT OFFICE 2,105,493

LUBRICATING APPARATUS

Elmer G. Gartin, Claremont, N. H., assignor to Sullivan Machinery Company, a corporation of Massachusetts Application December 3, 1934, Serial No. 755,733

21 Claims. (Cl. 184—55)

My invention relates to lubricating apparatus, and more particularly to lubricating apparatus for rock drilling motors, air-operated hoists, and the like, to which it is desirable to supply lubricant along with the operating medium.

In the lubrication of rock drills, portable air-operated hoists and similar devices, it is convenient and desirable to supply the lubricant from a lubricating device arranged in the air line; and it is desirable, under such circumstances, to provide positive lubricant supply, to be advised when lubricant supply ceases due to exhaustion of the lubricant, to have lubricant supplied only when the motor to be lubricated is in operation, to have an automatic interruption of lubricant supply upon cessation of operation of the motor, and to provide for easy refilling of the lubricant-containing chamber from which the lubricant is supplied to the stream of air flowing to the motor to be lubricated.

It is an object of the present invention to provide an improved lubricator—an improved lubricator which possesses the advantages above specified. More specifically, it is an object of the present invention to provide an improved lubricator having an improved pressure fluid controlled device incorporated therein for permitting lubricant supply when air is flowing to the device to be lubricated, but automatically interrupting lubricant supply when the air supply is discontinued. Still another object of my invention is to provide an improved lubricator having improved telltale means to indicate when the lubricant within the lubricator is exhausted and affording an indication of approaching exhaustion prior to the time when exhaustion actually occurs. Yet another object of the invention is to provide an improved automatic lubricator for an air line, in which there is positive lubricant supply, with control of the delivery of the lubricant positively supplied by conditions created as a result of air flow through the lubricator. Other objects and advantages of the invention will hereinafter more fully appear.

In the accompanying drawing, in which one form which the invention may assume in practice has been shown for purposes of illustration:—

Fig. 1 is a side elevation of a lubricator constructed in accordance with the illustrative embodiment;

Fig. 2 is a central longitudinal section through the lubricator;

Fig. 3 is a fragmentary sectional view on the planes corresponding to the line 3—3 of Fig. 2;

Fig. 4 is a section similar to that of Fig. 3 showing parts in different relative positions;

Fig. 5 is an enlarged detail sectional view through the automatic control valve on the same section as Fig. 2.

Referring to the drawing, it will be observed that the lubricator is in the form of an elongated casing 1 having projecting portions 2 and 3 of reduced diameters at its opposite ends. The casing is made in two parts, a main body portion 4 and a head portion 5, with the latter the portion 2 being integral. Within the body portion 4 is a chamber 6 in which a piston 7 is reciprocable. The piston 7 is secured to a tubular hollow piston rod 8 having a bore 9 which receives and permits the rod to slide upon a stationary hollow guide member 10 suitably supported and fixed at its end 11 within the bore 12 in the portion 2. The piston 7 comprises an abutment plate 13, an intermediate plate 14, another abutment plate 15, and a clamping nut 16, there being provided suitable cup packings 17 and 18 respectively between the plates 13 and 14 and 15 and 14. The bore 6 at the left hand side of the piston constitutes a lubricant receiving chamber, and lubricant may be supplied to it upon removal of a filler plug 20, the lubricant entering the chamber being passed through a screen 21 to prevent the access of solid impurities into the reservoir. A passage 25 communicates with the lubricant chamber near the screen 21 and extends longitudinally in the wall of the member 4, and at the opposite end of the latter communicates with an automatic control mechanism 26. The reduced portion 3 provides a connection 27 for a fluid supply connection, and has a passage 28 which is controlled by a rotatable throttle valve 29. Passage 28 opens into a chamber 30 in open communication with the chamber 6 at the right hand side of the piston and across which a narrow web or bar 31 extends, so that there is a rush of fluid at the opposite sides of the web when flow is taking place through the lubricator. The guide member 10 is hollow as at 32 and at one end is adjacent the web 31 and at its opposite end has a connection 33 for a pipe or the like leading to the motor to be lubricated. The throttle valve 29 has a passage 34 therethrough, and when the valve is in the position shown in Fig. 2 there is flow straight through 28, 34, 30, 32 and 33, and on to the motor to be lubricated.

It will be observed that the piston 7 presents a larger area at its right-hand end in Fig. 2 than its cross sectional area between the periphery of the piston rod and the wall of the chamber 6.

Accordingly the pressure which passes into the chamber 30, acting on the end of the piston, will build up a pressure greater than line pressure, and the lubricant will be forced through the passage 25 to the automatic controlling mechanism 26.

This automatic control valve mechanism comprises a removable element 36, threadedly mounted at 37 in the casing and having a bore 38 therein. Within the bore, which is a stepped bore having a smaller portion 39 and a larger portion 40, whose cross sectional areas are in the same relative proportions as the effective cross sectional areas of the piston 7 respectively on the left-hand face thereof, within the chamber 6, and on the right-hand end thereof, both as viewed in Fig. 2, there is reciprocable a differential controlling valve 42 having portions respectively fitting the bores 39 and 40. The valve is traversed by a small passage 43 which is adapted to be closed on upward valve movement by an adjustable needle valve 44 suitably packed as at 45. A spring 46 received in a chamber 47 in the differential valve normally raises the latter and closes the passage through the latter by engagement between the needle valve and the differential valve. A passage 49 having a mouth 50 directed away from the throttle valve 29 extends from the bottom of the chamber 40 down to approximately the axis of the passage 32.

Now it will be observed that when the throttle valve is open there will be a rush of pressure fluid past the portion 31, and accordingly there will be a reduction in pressure within the passage 49 and so beneath the valve 42. The spring 46 will provide only very light pressure, and when flow at normal rate is occurring there will be a sufficient reduction in pressure beneath the valve 42 so that the spring pressure will be overcome and the valve 42 will move down and permit lubricant supply through the center of the valve and through the passage 49, 50 into the lubricant stream. When, however, the air flow is discontinued the pressure in the passage 49 will rise to line pressure and the spring 46 plus the pressure on the larger lower end of the valve 42 will move the latter upwardly and interrupt lubricant flow through the valve.

A spring pressed plunger 52 having a loading spring 53 and a projectable stem 54 is arranged in a bore 55 in the head portion 5 of the casing 1, and projects at its right-hand end in Fig. 2 into the lubricant reservoir into position for engagement by the piston 7 as the lubricant chamber approaches emptiness. The operator upon seeing the increased projection of the portion 54 will be advised that it is time to refill the reservoir.

To facilitate refilling the reservoir, the following arrangements are made. There is provided an annular groove 56 in the head member 5 surrounding the periphery of the hollow piston rod 8. The piston rod is provided with a longitudinal groove 57 extending for a substantial distance along its length, and adapted to connect the space within the lubricant chamber with the groove 56 throughout most of the movement of the piston. Groove 56 is connected by a passage 58 with an opening 59 into the bore in which the throttle valve 29 rotates, passage 58 being located above the top of the passage 28. In the solid upper part of the valve 29 a right-angle passage 60 is formed, which in the position of the throttle valve shown in Fig. 3 communicates at one end with the fluid conducting means or passage 58 but has its other end blanked off. When, however, the throttle valve is moved to the position shown in Fig. 4 pressure fluid passing through a small passage 61 from the connection 27 flows through fluid conducting means including the passage 60, passage 58, groove 56 and longitudinal groove 57, and acts upon the left-hand side of the piston 7; and since a passage 62 in the throttle valve, which opens into passage 34 of the latter, then communicates with the right-hand end of the bore in which the piston 7 reciprocates, while the through passage 34 in the throttle valve communicates with an exhaust 63, it will be evident that fluid pressure will force the piston 7 to the right-hand end of the chamber 6 in suitable position for refilling. The throttle valve may then be turned through a slight angle to interrupt communication of the passage 60 with the passage 58, without readmitting pressure into the chamber 30, and the filler cap can then be removed, and with the escape of the pressure from the chamber 6, lubricant can be resupplied. Obviously by returning the throttle valve to the position shown in Figs. 2 and 3, the refilled lubricator may again be made operative.

As the mode of operation of the device has been explained as the different portions thereof have been described, it is unnecessary to do more than point out that when the throttle valve is in the position shown in Figs. 2 and 3, the lubricant will be placed under a pressure greater than line pressure, and upon flow through the passage 32 the valve 42 will be moved down to permit lubricant discharge, at a rate controlled by the adjustment of the needle valve 44, into the moving air stream. When the lubricator approaches emptiness the telltale pin 54 will be moved out to a position to warn the operator that refilling will shortly be necessary. Refilling can be easily accomplished by the manipulation of the throttle valve to a position to cause the piston 7 to move over to the right-hand end of the chamber 6 and subsequent complete interruption of all air access to both sides of the reservoir.

It will be evident that I have provided a lubricator which is not complicated in construction, is positive in action, automatically prevents loss of lubricant through dripping when no lubricant supply is desired, may be readily refilled when it automatically indicates the need for refilling, and in which the parts are entirely protected from dust and not subject to any possible undesired effects due to traction or thrusts upon the flexible connections leading to the lubricator.

While I have in this application specifically described one form which my invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. In a lubricator, means providing a lubricant reservoir, means providing a passage for conducting pressure fluid, means for creating a lubricant pressure in excess of the pressure of the pressure fluid in said passage whenever said passage is under pressure, irrespective of flow therethrough, means for conducting lubricant at such pressure to said passage, and means for controlling said conducting means governed by reduced pressure produced by pressure fluid flow through said passage.

2. In a lubricator, means providing a lubricant reservoir, means providing a passage for conducting pressure fluid, means for creating a lubricant pressure in excess of the pressure of the pressure fluid in said passage, means for conducting lubricant at such pressure to said passage, and means for controlling said conducting means including a differential valve having opposite ends presenting mutually different end areas in all positions thereof and subjected when no flow is occurring in said passage, upon its opposite ends, to lubricant and to passage pressures, respectively.

3. In a lubricator, means providing a lubricant reservoir, means providing a passage for conducting pressure fluid, means for creating a lubricant pressure in excess of the pressure of the pressure fluid in said passage, means for conducting lubricant at such pressure to said passage, means for controlling said conducting means automatically to preclude flow therethrough except when pressure fluid is flowing in said passage, and means inactive until the time said reservoir approaches emptiness for indicating approaching emptiness of said reservoir.

4. In a lubricator, means providing a lubricant reservoir, means providing a passage for conducting pressure fluid, means for creating a lubricant pressure which is, irrespective of whether or not there is pressure fluid flow in said passage in excess of the pressure of the pressure fluid in said passage, means for conducting lubricant at such pressure to said passage, and means for controlling said conducting means including a valve subjected on one end thereof to lubricant pressure and upon its other end to a pressure which varies dependently upon pressure fluid flow in said passage.

5. In a lubricator, means providing a lubricant reservoir, means providing a passage for conducting pressure fluid, means for creating a lubricant pressure in excess of the pressure of the pressure fluid in said passage, means for conducting lubricant at such pressure to said passage, and means for controlling said conducting means including a hollow valve having a longitudinal passage therethrough sealed when no pressure fluid is flowing through said first mentioned passage and the latter is under pressure.

6. In a lubricator for a pressure fluid supply line, a casing having at one end a passage constituting a motive fluid supply connection, within the casing a piston having a hollow piston rod open throughout its length, and, at the other end of the casing, means providing a bore for receiving said rod and which houses the rod in all the positions thereof, the outer end of said bore providing means supporting a delivery means for motive fluid entering said casing through said passage, said casing providing between the piston and the last-mentioned casing end a lubricant reservoir, and means for conducting lubricant from a point near the last-mentioned end of the casing to said passage.

7. In a lubricator for a pressure fluid supply line, a casing having at one end a passage constituting a fluid supply connection, within the casing a piston having a hollow piston rod, and at the other end of said casing means providing a bore within which the rod extends and, at a point beyond the extreme position attained by said rod in said bore, a delivery connection for fluid which enters said casing through said fluid supply connection, said casing providing between the piston and the last mentioned casing end a lubricant reservoir, and means for conducting lubricant from a point near the last-mentioned end of the casing to a point adjacent the axis of said passage.

8. In a lubricator for a pressure fluid supply line, a casing having at one end a passage constituting a fluid supply connection, within the casing a piston having a hollow piston rod, and at the other end of the casing a bore within which the rod extends, said casing providing between the piston and the last-mentioned casing end a lubricant reservoir, and means for conducting lubricant from a point near the last-mentioned end of the casing to said passage including a differential valve having bore-fitting portions of different transverse sections respectively and subjected to lubricant pressure and to line or a lesser fluid pressure respectively on its opposite ends.

9. In a lubricator for a pressure fluid supply line, a casing having at one end a passage constituting a fluid supply connection, within the casing a piston having a hollow piston rod, and at the other end of said casing means providing a bore within which the rod extends and, at a point beyond the extreme position attained by said rod in said bore, a delivery connection for fluid which enters said casing through said fluid supply connection, said casing providing between the piston and the last mentioned casing end a lubricant reservoir, passage means for conducting lubricant from a point near the last-mentioned end of the casing to said passage, and fluid conducting means distinct from said lubricant conducting passage means for conducting pressure fluid from said passage to said reservoir to move said piston to reservoir filling position.

10. In a lubricator for a pressure fluid supply line, a casing having at one end a passage constituting a fluid supply connection, within the casing a piston having a hollow piston rod, and at the other end of said casing means providing a bore within which the rod extends and, at a point beyond the extreme position attained by said rod in said bore, a delivery connection for fluid which enters said casing through said fluid supply connection, said casing providing between the piston and the last mentioned casing end a lubricant reservoir, means for conducting lubricant from a point near the last mentioned end of the casing to said passage, and valve means for selectively directing flow of pressure fluid to either end of said casing at will.

11. In an air line lubricator, a casing providing a cylinder, a piston in the latter, said piston having a hollow piston rod extending through an end of the cylinder and said casing at one end housing said piston rod in all positions of the latter, said casing having a connection for the admission of air thereto at its other end and provision for the delivery of air at its first-mentioned end, whereby an air stream may flow from end to end through the lubricator, the space in the cylinder surrounding the piston rod constituting a lubricant reservoir, and means for conducting lubricant from said space to an air stream flowing through said lubricator.

12. In an air line lubricator, a casing providing a cylinder, a piston in the latter, said piston having a hollow piston rod extending through an end of the cylinder and said casing at one end housing said piston rod in all positions of the latter, said casing having a connection for the admission of air thereto at its other end and provision for the delivery of air at its first-mentioned end, whereby an air stream may flow from end to end through the lubricator, the space in the cylinder surrounding the piston rod constituting a lubricant reservoir, a tell tale actuated by said piston when the lubricant in said lubricant reservoir nears exhaustion, and means for conducting lubricant from said space to an air stream flowing through said lubricator.

13. In an air line lubricator, a casing providing a cylinder, a piston in the latter, said piston having a hollow piston rod extending through an end of the cylinder and said casing at one end housing said piston rod in all positions of the latter, said casing having a connection for the admission of air thereto at its other end and provision for the delivery of air at its first-mentioned end, whereby an air stream may flow from end to end through the lubricator, the space in the cylinder surrounding the piston rod constituting a lubricant reservoir, a tell tale disposed parallel to said piston rod and actuated by said piston when the lubricant in said lubricant reservoir nears exhaustion, and means for conducting lubricant from said space to an air stream flowing through said lubricator.

14. In a lubricator, means providing a lubricant reservoir, means providing a passage for conducting pressure fluid, means for creating a lubricant pressure in excess of the pressure of the pressure fluid in said passage whenever said passage is under pressure, irrespective of flow therethrough, means for conducting lubricant at such pressure to said passage, and means for controlling said conducting means including a differential valve subjected when no flow is occurring in said passage, upon its opposite ends to lubricant and to passage pressures, respectively.

15. In a lubricator, means providing a lubricant reservoir, means providing a passage for conducting pressure fluid extending through said reservoir, means for creating a lubricant pressure in excess of the pressure of the pressure fluid in said passage, means for conducting lubricant at such pressurer to said passage, means for controlling said conducting means, and means made effective only as the lubricant supply nears exhaustion for indicating approaching emptiness of said reservoir.

16. In a lubricator, means providing a lubricant reservoir, means providing a passage for conducting pressure fluid, means for creating a lubricant pressure in excess of the pressure of the pressure fluid in said passage, means for conducting lubricant at such pressure to said passage, and means for regulating and controlling lubricant delivery to said passage including coaxial valves respectively governing maximum rate of delivery and the initiation and interruption of delivery.

17. In a lubricator, means providing a lubricant reservoir, means providing a passage for conducting pressure fluid, means for creating a lubricant pressure in excess of the pressure of the pressure fluid in said passage, means for conducting lubricant at such pressure to said passage, and means for controlling said conducting means including a valve element axially bored to provide a passage therethrough and a stationary element cooperating with said valve in one position of the latter to close the passage therethrough.

18. In a lubricator, means providing a lubricant reservoir, means providing a passage for conducting pressure fluid, means for creating a lubricant pressure in excess of the pressure of the pressure fluid in said passage, means for conducting lubricant at such pressure to said passage, and means for controlling said conducting means including a valve element axially bored to provide a passage therethrough and a stationary element cooperating with said valve in one position of the latter to close the passage therethrough, said stationary element being adjustable axially to control the quantity of lubricant passing through said valve element.

19. In a lubricator for a pressure fluid supply line, a casing having at one end a passage constituting a fluid supply connection, a piston within said casing and having a hollow piston rod, means forming a conduit through which pressure fluid flowing from said fluid supply connection is conducted through said casing, said hollow piston rod surrounding a portion of said conduit means and movable longitudinally relative to the latter, means at the other end of said casing providing a bore into which the piston rod passes upon movement of said piston toward the last mentioned end of said casing, said casing providing between the piston and the last mentioned casing end a lubricant reservoir, and means for conducting lubricant from a point near the last mentioned end of the casing to a point adjacent the axis of said passage.

20. In a lubricator for a pressure fluid supply line, a casing having at one end a passage constituting a fluid supply connection, a piston within said casing and having a hollow piston rod, means forming a conduit through which pressure fluid flowing from said fluid supply connection is conducted through said casing, said hollow piston rod surrounding a portion of said conduit means and movable longitudinally relative to the latter, means at the other end of said casing providing a bore into which the piston rod passes upon movement of said piston toward the last mentioned end of said casing, said casing providing between the piston and the last mentioned casing end a lubricant reservoir, means for conducting lubricant from a point near the last mentioned end of the casing to said passage, and means distinct from said lubricant conducting means for conducting pressure fluid from said passage to the reservoir to move said piston to reservoir filling position.

21. In a lubricator for a pressure fluid supply line, a casing having at one end a passage constituting a fluid supply connection, a piston within said casing and having a hollow piston rod, means forming a conduit through which pressure fluid flowing from said fluid supply connection is conducted through said casing, said hollow piston rod surrounding a portion of said conduit means and movable longitudinally relative to the latter, means at the other end of said casing providing a bore into which the piston rod passes upon movement of said piston toward the last mentioned end of said casing, said casing providing between the piston and the last mentioned casing end a lubricant reservoir, means for conducting lubricant from a point near the last mentioned end of the casing to said passage, and valve means for supplying pressure fluid to either end of said casing at will.

ELMER G. GARTIN.